(12) United States Patent
Burger et al.

(10) Patent No.: US 12,267,224 B2
(45) Date of Patent: Apr. 1, 2025

(54) EDGE UTILITY MANAGEMENT (71) Applicant: ABB Schweiz AG, Baden (CH)

(72) Inventors: Andreas Burger, Weingarten (DE); Nicolas Coppik, Darmstadt (DE); Jens Heuschkel, Weiterstadt (DE); Jens Doppelhamer, Ladenburg (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/193,821

(22) Filed: Mar. 31, 2023

(65) Prior Publication Data

US 2023/0318957 A1    Oct. 5, 2023

Related U.S. Application Data (63) Continuation of application No. 17/708,805, filed on Mar. 30, 2022, now Pat. No. 11,634,147.

(30) Foreign Application Priority Data

Apr. 4, 2022   (EP) ..................................... 22166488

(51) Int. Cl.
*H04L 43/16* (2022.01)
*B60C 23/04* (2006.01)
(Continued)

(52) U.S. Cl.
CPC .......... *H04L 43/16* (2013.01); *B60C 23/0484* (2013.01); *G06F 9/5044* (2013.01);
(Continued)

(58) Field of Classification Search
CPC ............................ H04L 67/55; H04L 41/5054
See application file for complete search history.

(56) References Cited

U.S. PATENT DOCUMENTS 10,846,070 B2   11/2020  Nassaur
10,936,039 B2    3/2021  Guim Bernat et al.
(Continued)

FOREIGN PATENT DOCUMENTS

CN   111049876 A    4/2020
CN   111813502 A   10/2020

OTHER PUBLICATIONS

Fu et al., "QoS—Aware and Resource Efficient Microservice Deployment in Cloud-Edge Continuum," *2021 IEEE International Parallel and Distributed Processing Symposium (IPDPS)*, 932-941 (May 17, 2021).

(Continued)

*Primary Examiner* — Barbara B Anyan
(74) *Attorney, Agent, or Firm* — Leydig, Voit & Mayer, Ltd.

(57) ABSTRACT

An edge utility management method includes receiving an application to be deployed on an edge device, wherein the application comprises a plurality of separately-deployable application parts; obtaining application profiles for one or more of the applications parts; obtaining hardware profiles for one or more hardware resources of the edge device; deploying the application parts to selected hardware resources based on the application profiles and the hardware profiles; and facilitating communication between the deployed application parts during execution of the application.

18 Claims, 4 Drawing Sheets

(51) Int. Cl.
  *G06F 9/50* (2006.01)
  *H04L 67/55* (2022.01)
  *H04L 67/565* (2022.01)

(52) U.S. Cl.
  CPC ...... *G06F 9/5066* (2013.01); *G06F 2209/501* (2013.01); *G06F 2209/508* (2013.01); *H04L 67/55* (2022.05); *H04L 67/565* (2022.05)

(56) References Cited

U.S. PATENT DOCUMENTS

| | | |
|---|---|---|
| 10,944,689 B2 | 3/2021 | Guim Bernat et al. |
| 11,582,027 B1* | 2/2023 | Lawton ................. H04L 9/0891 |
| 2009/0262741 A1* | 10/2009 | Jungck ................ H04L 41/5054 370/392 |
| 2018/0340411 A1* | 11/2018 | Munda .................... E21B 44/00 |
| 2020/0145337 A1 | 5/2020 | Keating et al. |
| 2020/0178198 A1* | 6/2020 | Ding ..................... H04W 60/04 |
| 2022/0060431 A1 | 2/2022 | Vadayadiyil Raveendran et al. |
| 2022/0116755 A1* | 4/2022 | Filippou ............... H04L 67/565 |
| 2022/0167262 A1* | 5/2022 | Ding ....................... H04L 67/55 |

OTHER PUBLICATIONS

European Patent Office, Extended European Search Report in European Patent Application No. 22166488.1, 9 pp. (Sep. 15, 2022).
Matic et al., "Optimization of MQTT Communication Between Microservices in the IoT Cloud," *IEEE International Conference on Consumer Electronics* (ICCE), 3 pp. (Jan. 10, 2021).
European Patent Office, Office Action in European Patent Application No. 22166488.1, 8 pp. (Jun. 21, 2024).

* cited by examiner

EDGE UTILITY MANAGEMENT

CROSS-REFERENCE TO RELATED APPLICATIONS

This patent application claims priority to European Patent Application No. 22166488.1, filed on Apr. 4, 2022, which is incorporated herein in its entirety by reference.

FIELD OF THE DISCLOSURE

The present disclosure relates to systems and methods for performing utility management in edge computing devices.

BACKGROUND OF THE INVENTION

Industrial automation systems increasingly use cloud services for specific analytics and AI solutions. Edge devices are important for providing such solutions near to the devices in cases where the amount of data involved cannot be transferred to the cloud. There is a need for methods and systems for optimizing the use of these edge devices.

BRIEF SUMMARY OF THE INVENTION

To better address one or more of these concerns, in a first aspect of invention there is provided a computer-implemented edge utility management method. The method comprises: receiving an application to be deployed on an edge device. The application may comprise a plurality of separately-deployable application parts. The method may further comprise obtaining application profiles for one or more of the applications parts. The method may further comprise obtaining hardware profiles for one or more hardware resources of the edge device. The method may further comprise deploying the application parts to selected hardware resources based on the application profiles and the hardware profiles. The method may further comprise facilitating communication between the deployed application parts during execution of the application.

Edge utility management as described herein may be described as holistic. The method may comprise using holistic access to the hardware resources of the edge device. Holistic access may comprise accessing hardware resources from an entire hardware stack of the edge device. Holistic access may comprise accessing hardware resources across operating system boundaries. Holistic access may comprise accessing hardware resources operating using a plurality of different operating systems. Holistic access may comprise accessing hardware resources using APIs provided by a plurality of different operating systems. Holistic access may comprise accessing hardware resources without OS-based restrictions. Holistic access may comprise accessing both general-purpose hardware resources and specific-purpose hardware resources.

The application may be a distributed application. The application parts may be loosely coupled. The application may comprise a service-oriented architecture. The application may comprise a microservice architecture. The application may comprise a plurality of loosely-coupled services, each application part corresponding to a said service.

The application profile may comprise one or more execution requirements and/or execution preferences relating to the respective application part. The application profile may comprise metadata describing the application part. The metadata may be user-provided. The metadata may comprise one or more tags. The metadata may indicate one or more suitable instances and/or classes of hardware resources for executing the application part. The method may comprise analysing the application parts to determine their execution requirements. The execution requirements may be specified by, or derivable from, the metadata associated with the application part.

The hardware profile may comprise one or more properties of the respective hardware resource. The one or more properties may relate to capabilities and/or specialties of the respective hardware resource. The method may comprise analysing the hardware resources of the edge device to determine their properties. The hardware profile may indicate availability of the respective hardware resource. The method may comprise determining availability of one or more hardware resources.

Deploying the application parts may comprise allocation of hardware resources based on the specific application parts. Deploying the application parts may comprise distributing the application parts across the hardware resources. Deploying may comprise allocating special-purpose hardware resources to application parts that require, or benefit from, such hardware. Deploying may comprise allocating general-purpose hardware resources to application parts having no special execution requirements. Deploying the applications parts may be performed according to the suitability of the selected hardware resources to execute the respective application parts. The method may comprise determining one or more suitability indicators indicating the suitability of the hardware resource to execute the application part, based for example on the application profile and/or hardware profile, and deploying the application parts based on the suitability indicators. Selecting the hardware resources may comprise selecting the hardware resources according to their suitability indicators. The method may comprise ranking the hardware resources according to suitability. The method may comprise determining which hardware resources of the edge device are capable of executing a particular application part.

The method may comprise determining which hardware resources of the edge device are specially adapted for executing a particular application part. Selecting hardware resources may comprise selecting the hardware resource having the maximum calculated suitability indicator with respect to a particular application part. The suitability indicator may comprise a suitability score or value. The suitability indicator may comprise a function of the properties of the hardware resource, for example a sum of weighted properties. The method may comprise obtaining suitability indicators and/or properties of hardware resources from a hardware resource profile database. The method may comprise configuring or reconfiguring one or more hardware resources of the edge device to increase their suitability for executing one or more application parts based on the application profiles. Selecting the hardware resources may comprise mapping the application parts to hardware resources based on the application profiles and hardware profiles. Mapping may comprise determining a resource allocation mapping.

The application parts may comprise one or more application parts designated as being safety-relevant, time-critical, time-sensitive, or real-time, wherein the method comprises deploying those application parts to the fastest available processors, for example real-time processor cores. The execution requirements for a particular application part may specify a required execution time or cycle time. The method may comprise deploying the application part to a real-time processor core based on the execution time or cycle time falling within a predetermined range or below a predetermined threshold.

The application parts may comprise one or more application parts designated as being AI-related or neural network-related, wherein the method comprises deploying those application parts to one or more FPGAs. Additionally, or alternatively, one or more application parts may implement a performance-intensive algorithm which is suitable to be installed on hardware-near technology such as a FPGA. Additionally, or alternatively, one or more application parts may comprise a fieldbus software stack which to operates at a fast cycle time. The method may comprise deploying any such application parts that benefit from fast execution to one or more FPGAs.

The application parts may comprise one or more application parts designated as being non-time-critical, non-time-sensitive, deferrable, delay-tolerant, non-urgent, asynchronous, or undemanding, wherein the method comprising deploying those parts to one or more sandboxes.

The method may comprise using one or more APIs to access the hardware resources. The method may comprise using APIs provided by an operating system to access general-purpose hardware resources. The method comprises using APIs provided by a real-time operating system to access real-time processor cores. The method may comprise using a dedicated API to access an FPGA.

Facilitating communication between the deployed application parts may comprise facilitating broker-based communication between the application parts. Facilitating communication may comprise implementing publish-and-subscribe messaging. Facilitating communication may comprise exchanging communications using the MQTT protocol. Facilitating communication may comprise translating messages provided by a sender and providing them to a recipient in translated form. Facilitating communication may comprise using shared memory to exchange messages.

The method may comprise monitoring the execution of the deployed application parts. Monitoring may be performed with reference to one or more selected performance indicators. The method may comprise regulating the execution of application parts which violate predetermined criteria. Regulating execution may comprise throttling, suspending, or stopping the execution of the application part. The predetermined criteria may define excessive resource consumption. The predetermined criteria may define malicious behaviour. The predetermined criteria may comprise one or more limits relating to resource utilization. Monitoring may comprise performing limit-based monitoring. A limit may comprise a resource consumption limit or a maximum utilization rate. Limits may be user-specified. Limits may be specified per hardware resource or per application part.

The method may comprise supporting prioritization of application parts. The method may comprise obtaining priority indicators for one or more application parts. The method may comprise regulating execution of the application parts based on priority indicators associated with one or more of those application parts. Regulating the execution may comprise throttling, suspending, or stopping the execution of one or more lower priority application parts to allow the continued execution of one or more higher priority application parts.

The method may comprise providing user output indicating resource consumption by the application parts. User output may be provided by means of a dashboard. The method may comprise receiving user input, which may be received by means of the dashboard. User input may relate to the predetermined criteria and/or metadata as described herein.

The method of the first aspect may alternatively be described as a method for deploying a distributed application in an edge computing environment.

According to a second aspect, there is provided a computing system, for example an edge utility management component, configured to perform the method of the first aspect.

According to a third aspect, there is provided an edge device comprising the edge utility management component of the second aspect.

According to a fourth aspect, there is provided a computer program product comprising instructions which, when executed by a computing system, enable or cause the computing system to perform the method of the first aspect.

According to a fifth aspect, there is provided a computer-readable medium comprising instructions which, when executed by a computing system, enable or cause the computing system to perform the method of the first aspect.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

Systems and methods as described herein facilitate improved or optimal distribution of applications among available edge hardware resources, including both general-purpose hardware resources (e.g., CPU cores) and special-purpose hardware resources (e.g., FPGAs, RT cores, etc.), as well as monitoring resource usage to mitigate overload situations and to enhance the ability of the edge device to meet targets or requirements relating to bandwidth, connectivity, cybersecurity, and so on. Such monitoring may take place on a higher abstraction level than when using a traditional container orchestrator, such as Kubernetes or docker swarm, which neither manages nor accesses such special-purpose hardware resources. Thus, provided is a form of holistic utility management, not limited only to containers via K8s, but encompassing also RT kernels and FPGAs, which can be used by original equipment manufacturers (OEMs) and/or their customers to manage the entire hardware stack of edge devices.

An "application" as referred to herein may be a process automation application or control (logic) application for controlling one or more automation devices in an industrial automation system. An application may perform one or more services and may execute one or more algorithms.

By "application part" or "part of an application" is meant herein any portion, service, component, or subcomponent of the application which can be executed and/or deployed independently or semi-independently of other parts. A part may provide a discrete unit of functionality. A part may correspond to a service of an application designed using a microservice architecture or other service-orientated architecture, or a part that results from application splitting. Parts of an application may be entirely decoupled from, or only loosely coupled with, other parts.

By "deploy" may be meant that the application or part of it is installed to a particular hardware resource to be executed by that hardware resource, for example by instructing the resource to implement control logic or functionality defined by that application or part. Equally, "deploy" may be comprise starting a containerized application using sandbox technology such as Kubernetes and the like.

"Utility management" as described herein may equivalently be referred to as "resource management".

"Holistic" as used herein in relation to edge devices pertains to the entire hardware stack of the edge device, or at least that part of it which is relevant for executing applications, without being restricted to particular instances or classes of hardware resources or particular operating systems operating in conjunction with those hardware resources. "Holistic" in this sense may be understood as all-encompassing, complete, across-the-board, whole, overall, or one-stop.

The terms "component", "system", "circuitry", "tool", and so on are used herein interchangeably.

DETAILED DESCRIPTION OF THE INVENTION

Figure 1:
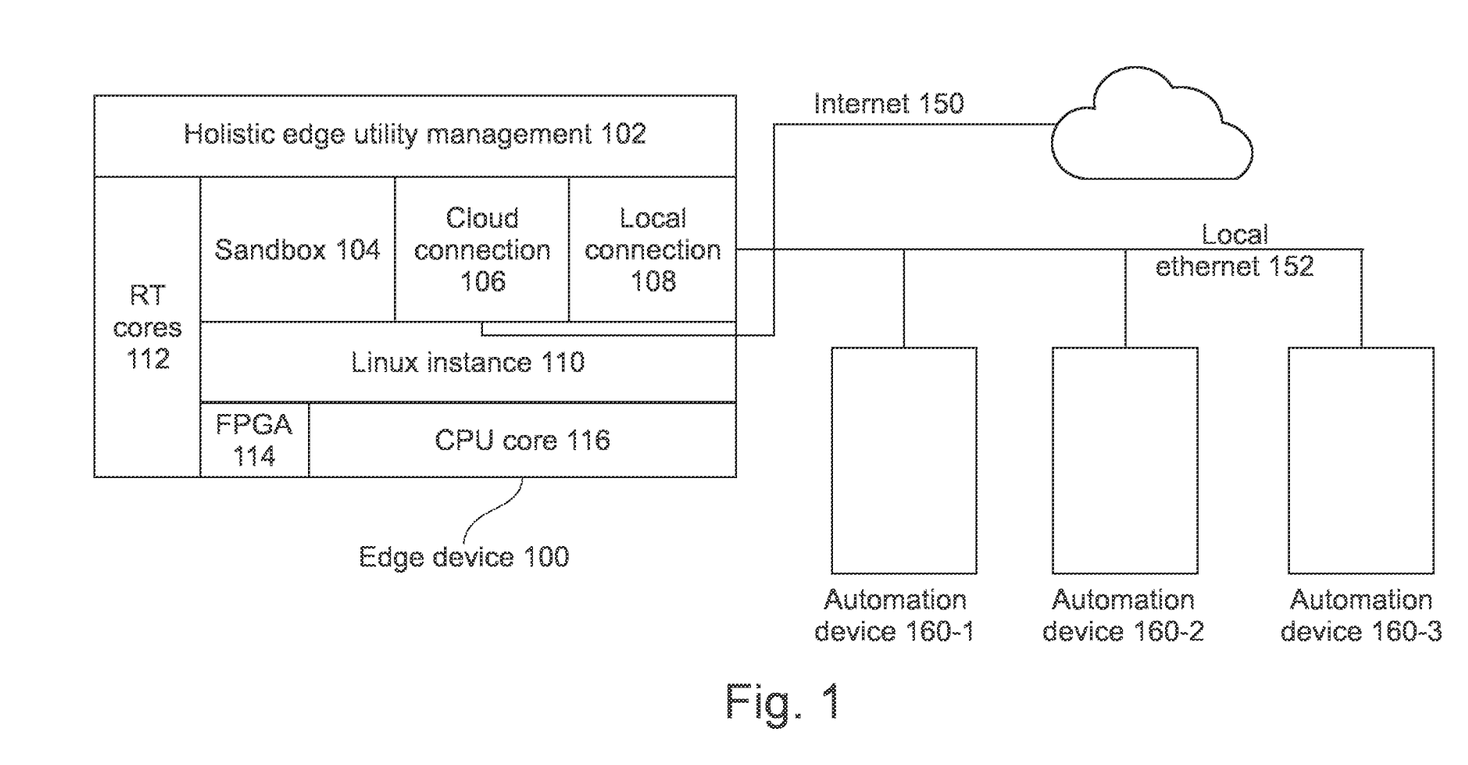
FIG. 1 is a diagram of an environment in which edge utility management according to the present disclosure may be performed.

FIG. 1 illustrates an environment in which systems and methods according to the present disclosure may be implemented. Edge computing device 100 forms part of an industrial automation system, providing gateway capabilities to automation devices 160, i.e., automation devices 160-1, 160-2, and 160-3. The edge device 100 in this non-limiting example comprises an edge utility management component 102, described in more detail hereinbelow, along with a sandbox 104, a cloud connection 106, a local connection 108, a Linux instance 110, one or more real-time (RT) processor cores 112, a field-programmable gate array (FPGA) 114, and at least one CPU core 116. The cloud connection 106 provides 'northbound' communication with the internet 150, while the local connection provides 'southbound' communication with the automation devices 160 via a local ethernet 152. In other examples, the ethernet 152 may be replaced or supplemented by at least one field bus and/or at least one wireless network, e.g., 4G or 5G. In one non-limiting example, the edge device 100 is implemented using an asymmetric processing architecture (AMP), but it will be understood that the present disclosure is not limited to such, and that symmetric processing architectures may equally be used. The edge device 100 may run parallel operating systems, for example, the Linux instance 110 as a general-purpose OS running on the CPU core 116 (e.g., an ARM x86/x64 core) as well as a real-time OS running on the RT cores 112 (e.g., ARM RT cores).

The edge utility management component 102 monitors resource usage of the hardware of the edge device 100. The edge utility management component 102 has access to all available hardware resources on the edge device 100. Although illustrated as a separate component of the edge device 100, the edge utility management component 102 may be implemented as a software service hosted by, or running on, the edge device 100. A suitable computing system for implementing the systems and methods of the present disclosure is described hereinbelow with reference to FIG. 4. The edge utility management component 102 may be described as being holistic, in that it monitors and uses the entire hardware stack of the edge device 100 without being locked into a specific operating system which is able to access only some of the hardware resources. Rather, the edge utility management component 102 provides an interface for monitoring and managing each available hardware resource.

The edge resource management component 102 deploys applications on the edge device 100. In particular, the edge resource management component 102 deploys distributed applications by distributing their parts across the different hardware components of the edge device 100. More particularly, the edge resource management component 102 deploys the applications in a resource-effective or optimal way, by allocating special-purpose hardware to specific parts of the application that require, or benefit from, such hardware.

Figure 2:
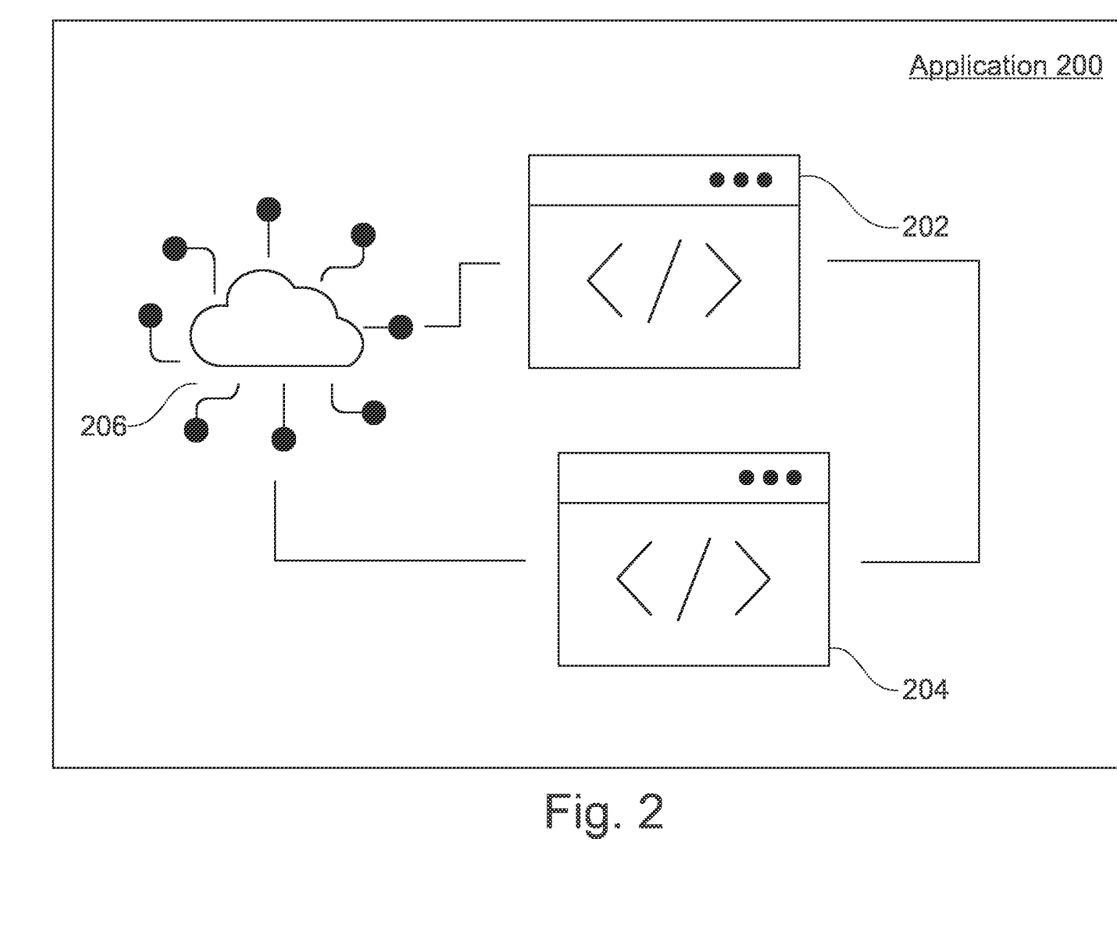
FIG. 2 is a diagram of a distributed application comprising separately deployable parts in accordance with the disclosure.

FIG. 2 illustrates a distributed application 200 comprising separately deployable parts 202, 204, and 206. The application 200 may implement control logic usable for controlling the industrial automation system. To facilitate dynamic and flexible deployment by the edge resource management component 102, the application 200 is designed to provide loosely coupled communication between the different parts 202-206 of the application 200. In this non-limiting example, the application 200 is designed using a microservice architecture, whereby the application 200 is formed as a collection of loosely-coupled services, with each part 202-206 corresponding to one service. Function of the application 200 may require communication between its parts 202-206, as indicated by FIG. 2.

The edge utility management component 200 is configured to allocate the parts of the distributed application 200 to different available hardware resources of the edge device 100. Each hardware resource has different processing capacities and specialties. The edge utility management component 102 distributes the application 200 across the different hardware resources of the edge device according to the suitability of those resources to execute the respective parts.

Figure 3:
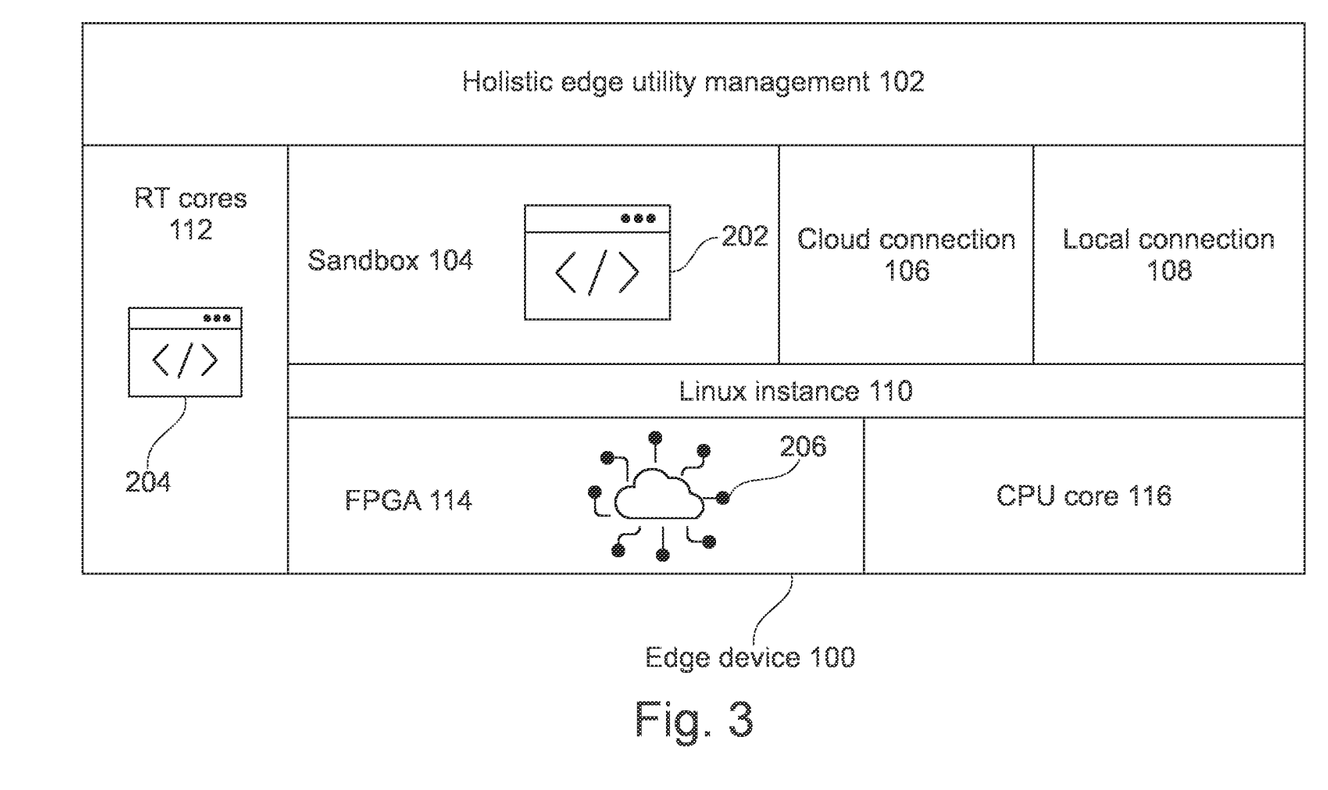
FIG. 3 is a diagram of deployment of the parts of the distributed application of FIG. 2 by an edge utility management component.

FIG. 3 illustrates one non-limiting example of the deployment of the parts 202-206 of the distributed application 200 by the edge utility management component 102. In this example, the edge utility management component 102 deploys that part 204 of the application which is safety-relevant or otherwise time-critical (for example, at the millisecond down to microsecond level) to the RT cores 112, i.e., to the real-time operating system (RTOS) running on the RT cores 112.

In contrast, that part 202 of the application 200 which performs less-demanding tasks is deployed to the sandbox 104 for execution by that component. The sandbox 104 may comprise, for example, a container virtualization sandbox.

Meanwhile, that part 206 of the application which is related to artificial intelligence (AI), such as a neural network, is deployed to the FPGA 114.

The edge device 100 provides appropriate mechanisms for enabling access by the edge utility management component 102 to the hardware resources, both special-purpose hardware, such as the FPGA 114 and RT cores 112, and general-purpose hardware. For example, the FPGA 114 is accessible via an API provided by the system on a chip (SoC) vendor, for example Vitis Suite from Xilinx. The same applies to the RT cores 112, in whose case the overlying RTOS provides access to the workload parameters of the RT cores 112. Further APIs, for example those provided by the general operating system, may be used by the edge utility management component 102 to access general-purpose hardware such as the CPU core 116, as well as storage, RAM, and so on. In this way, the edge utility management component 102 is provided with a holistic overview of the resource utilization of the entire hardware stack.

To support execution of the distributed application 200, the edge utility management component 102 facilitates communication between the hardware resources of the edge device 100. In particular, the edge utility management component 102 implements broker-based communication between hardware resources. Broker-based communication technology such as MQTT or similar may be used for this purpose, to facilitate the use of hardware resources over OS boundaries in a holistic way. To this end, the edge utility management component 102 may translate communications and provide them to the hardware resources via shared memory. Translation may take place using a messaging protocol selected by the edge utility management component 102. Such broker-based communication architecture ensures communication flow between the parts of the distributed application 200.

To facilitate dynamic and flexible deployment of the parts 202-206 of the distributed application 200, the edge utility management component 102 may use metadata describing those parts and/or the hardware resources. For example, the edge utility management component 102 may support user tagging of the parts 202-206 of the application 200. Using the tagging mechanism, the user can provide metadata for the specific parts 202-206 of the application 200 to facilitate proper deployment of the parts to suitable hardware resources, e.g., tagging the time-critical part 204 of the application 200 with "real-time" to ensure that this part 204 is deployed to the RT cores 112. This tagging may be realized during the process of uploading the application using a user interface of the edge utility management component 102.

After deployment, the edge utility management component 102 may monitor the different parts 202-206 of the application 200, for example using appropriate performance indicators, and may throttle, suspend, or stop applications or parts which violate predetermined criteria, e.g., by consuming too many resources or by exhibiting malicious behavior. Suitable mechanisms for this purpose including for example kill process/task, stop container, pods, etc.

The edge utility management component 102 may perform limit-based monitoring. In one non-limiting example, the user may set specific resource limits for one or more hardware resources (e.g., utilization of the CPU core 116 or RT cores 112, FPGA load, etc.) to provide upper limits which may not be exceeded. Limits can be specified per hardware resource or per application/part. For example, the user can specify that the maximum load on the CPU core 116 should not exceed 60%. In case a specific application or part consumes more resources than allowed by one or more upper limits, the edge utility management component 102 may throttle or shut down the application or part to ensure that the edge device 100 remains operable.

The edge utility management component 102 may support prioritization of applications or parts. The edge utility management component 102 may allow priorities to be set to prioritize one application or part over another. For example, core applications such as proprietary services, maintenance services, and firmware update services may be given a high priority, to avoid these services being shut down or throttled even when a specific resource is overloaded, whereas applications or parts having lower priority may be throttled or suspended when they overload resources or endanger other applications or parts, for example by putting too much communication load on the broker-based communication so that other applications have limited communication possibility.

The edge utility management component 102 may perform monitoring to detect, and optionally also prevent, malicious behavior. The edge utility management component 102 may be configured to stop or suspend applications or parts if they exhibit malicious behavior. Such behavior may include attempts to violate sandbox boundaries or invoke privileged functionality (e.g., a non-privileged application attempting to invoke a root-only 'syscall', or an application attempting to access resources to which it does not have access), as well as potentially malicious communication behavior such as attempting to initiate communication with unrelated applications. Attempts to deliberately exceed resource limits, overload the communication infrastructure, or abuse granted resources, for instance by deploying a malicious bitstream to an FPGA, may also constitute malicious behavior. Malicious behavior may be defined using a rule-based approach, using rules defined by domain experts, for example.

The edge utility management component 102 may provide a user interface, such as a dashboard or similar view of the edge device 100. The dashboard may provide an overview of resource consumption by applications and parts running on the edge device 100. The dashboard may accept user input, such as the user-specified limits described hereinabove. The edge utility management component 102 may be accessible directly by using a port on the edge device 100 or via the cloud connection 106.

Figure 4:
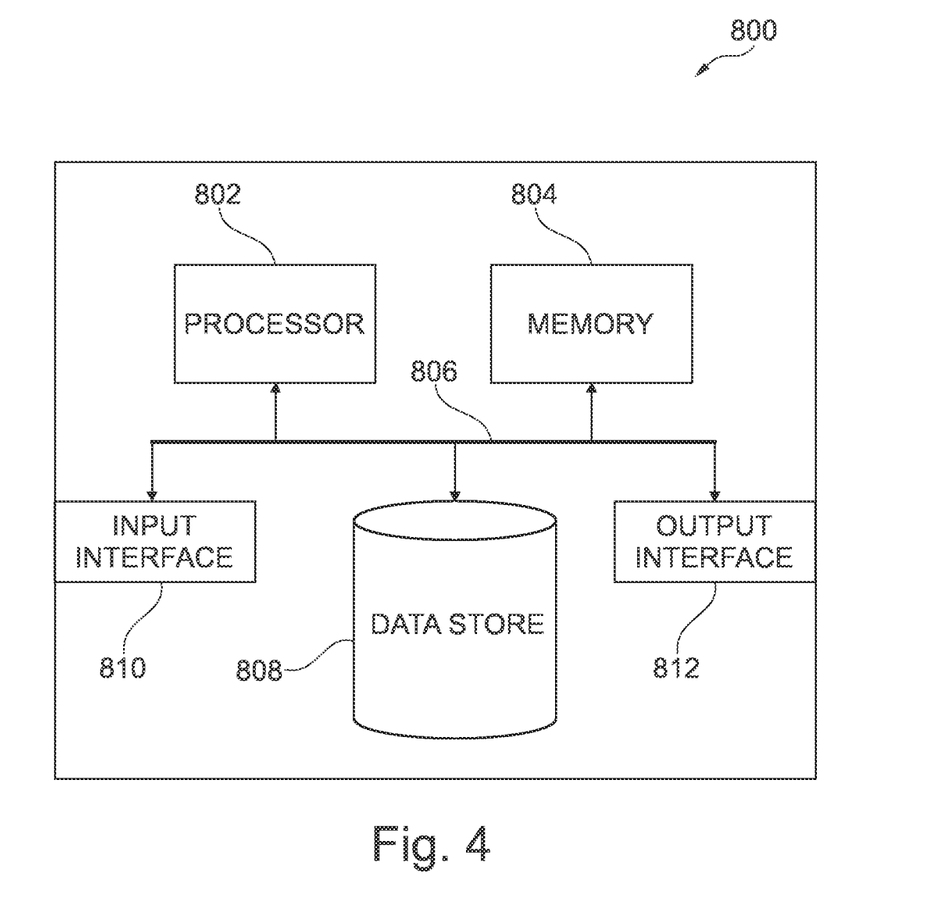
FIG. 4 is a diagram of a computing system that can be used in accordance with the systems and methods disclosed herein.

FIG. 4 illustrates an exemplary computing system 800 that can be used in accordance with the systems and methods disclosed herein. The computing system 800 may form part of or comprise any desktop, laptop, server, or cloud-based computing system. The computing system 800 includes at least one processor 802 that executes instructions that are stored in a memory 804. The instructions may be, for instance, instructions for implementing functionality described as being carried out by one or more components described herein or instructions for implementing one or more of the methods described herein. The processor 802 may access the memory 804 by way of a system bus 806. In addition to storing executable instructions, the memory 804 may also store conversational inputs, scores assigned to the conversational inputs, etc.

The computing system 800 additionally includes a data store 808 that is accessible by the processor 802 by way of the system bus 806. The data store 808 may include executable instructions, log data, etc. The computing system 800 also includes an input interface 810 that allows external devices to communicate with the computing system 800. For instance, the input interface 810 may be used to receive instructions from an external computer device, from a user, etc. The computing system 800 also includes an output interface 812 that interfaces the computing system 800 with one or more external devices. For example, the computing system 800 may display text, images, etc. by way of the output interface 812.

It is contemplated that the external devices that communicate with the computing system 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing system 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing system 800 may be a distributed system. Thus, for instance, several devices may be in communication by way of a network connection and may collectively perform tasks described as being performed by the computing system 800.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

Embodiments of the invention are described with reference to different categories. Some examples are described with reference to methods whereas others are described with reference to apparatus. However, a person skilled in the art will gather from the description that, unless otherwise notified, in addition to any combination of features belonging to one category, also any combination between features relating to different category is disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word "comprising" does not exclude other elements or steps.

The indefinite article "a" or "an" does not exclude a plurality. In addition, the articles "a" and "an" as used herein should generally be construed to mean "one or more" unless specified otherwise or clear from the context to be directed to a singular form.

A single processor or other unit may fulfil the functions of several items recited in the claims.

The mere fact that certain measures are recited in mutually different dependent claims does not indicate that a combination of these measures cannot be used advantageously.

A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "X comprises A and/or B" is satisfied by any of the following instances: X comprises A; X comprises B; or X comprises both A and B.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented edge utility management method performed by an edge utility management component, the method comprising:
    receiving an application to be deployed on an edge device, wherein the application comprises a plurality of separately-deployable application parts;
    obtaining application profiles for one or more of the applications parts;
    obtaining hardware profiles for a plurality of hardware resources of the edge device;
    deploying the application parts to selected hardware resources of the plurality of hardware resources based on the application profiles and the hardware profiles, wherein the deploying the application parts uses holistic access to the plurality of hardware resources, such that the selected hardware resources use a plurality of different operating systems and include both general-purpose hardware resources and specific-purpose hardware resources; and
    facilitating communication between the deployed application parts during execution of the application by implementing broker-based communication between the deployed application parts, wherein the broker-based communication enables translation of communications and provide the translated communications to the selected hardware resources, and wherein the translation is performed using a messaging protocol selected by the edge utility management component.

2. The method of claim 1, wherein the application parts comprise one or more application parts designated as being time-critical, and wherein the deploying the application parts comprises deploying the one or more application parts designated as being time-critical to one or more selected hardware resources that comprise fastest available processors.

3. The method of claim 1, wherein the application parts comprise one or more application parts designated as being AI-related, and wherein the deploying the application parts comprises deploying the one more application parts designated as being AI-related to one or more selected hardware resources that comprise one or more FPGAs.

4. The method of claim 1, wherein the application parts comprise one or more application parts designated as being non-time critical, and wherein the deploying the application parts comprises deploying the one or more applications parts designated as being non-time critical to one or more selected hardware resources that comprise one or more sandboxes.

5. The method of claim 1, comprising using one or more APIs to access the hardware resources.

6. The method of claim 1, further comprising monitoring the execution of the deployed application parts, and regulating the execution of the application parts which violate predetermined criteria.

7. The method of claim 6, wherein the predetermined criteria define excessive resource consumption.

8. The method of claim 6, wherein the predetermined criteria define malicious behavior.

9. The method of claim 1, comprising obtaining priority indicators for one or more of the application parts, and regulating execution of the application parts based on the priority indicators.

10. The method of claim 1, comprising providing user output using a dashboard, the user output indicating resource consumption by the application parts.

11. A computer-readable, tangible medium comprising instructions which, when executed by a computing device, enable the computing device to carry out a computer-implemented edge utility management method, the method comprising:
    receiving an application to be deployed on an edge device, wherein the application comprises a plurality of separately-deployable application parts;
    obtaining application profiles for one or more of the applications parts;
    obtaining hardware profiles for a plurality of hardware resources of the edge device;
    deploying the application parts to selected hardware resources of the plurality of hardware resources based on the application profiles and the hardware profiles, wherein the deploying the application parts uses holistic access to the plurality of hardware resources, such that the selected hardware resources use a plurality of different operating systems and include both general-purpose hardware resources and specific-purpose hardware resources; and
    facilitating communication between the deployed application parts during execution of the application by implementing broker-based communication between the deployed application parts, wherein the broker-based communication enables translation of communications and provide the translated communications to the selected hardware resources, and wherein the translation is performed using a messaging protocol selected by an edge utility management component.

12. The medium of claim 11, wherein the application parts comprise one or more application parts designated as being time-critical, and wherein the deploying the application parts comprises deploying the one or more application parts designated as being time-critical to one or more hardware resources that comprise fastest available processors.

13. The medium of claim 11, wherein the application parts comprise one or more application parts designated as being AI-related, and wherein the deploying the application parts comprises deploying the one or more application parts designated as being AI-related to one or more hardware resources that comprise one or more FPGAs.

14. The medium of claim 11, wherein the application parts comprise one or more application parts designated as being non-time critical, and wherein the deploying the application parts comprises deploying the one or more application parts designated as being non-time critical to one or more hardware resources that comprise one or more sandboxes.

15. The medium of claim 11, comprising using one or more APIs to access the hardware resources.

16. The medium of claim 11, further comprising monitoring the execution of the deployed application parts, and regulating the execution of application parts which violate predetermined criteria.

17. A computer-implemented edge utility management method performed by an edge utility management component, the method comprising:

receiving an application to be deployed on an edge device, wherein the application comprises a plurality of separately-deployable application parts;

obtaining application profiles for one or more of the applications parts;

obtaining hardware profiles for one or more hardware resources of the edge device;

deploying the application parts to selected hardware resources of the one or more hardware resources;

facilitating communication between the deployed application parts during execution of the application by implementing broker-based communication between the deployed application parts, wherein the broker-based communication enables translation of communications and provide the translated communications to the selected hardware resources, and wherein the translation is performed using a messaging protocol selected by the edge utility management component;

monitoring the execution of the deployed application parts; and regulating the execution of the application parts which violate predetermined criteria, wherein the regulating the execution of the application parts comprises throttling, suspending, or stopping at least one application part of the application parts.

18. The medium of claim 16, wherein the regulating the execution of the application parts comprises throttling, suspending, or stopping at least one application part of the application parts.

* * * * *

UNITED STATES PATENT AND TRADEMARK OFFICE
CERTIFICATE OF CORRECTION

| | | |
|---|---|---|
| PATENT NO. | : 12,267,224 B2 | Page 1 of 1 |
| APPLICATION NO. | : 18/193821 | |
| DATED | : April 1, 2025 | |
| INVENTOR(S) | : Burger et al. | |

It is certified that error appears in the above-identified patent and that said Letters Patent is hereby corrected as shown below:

On the Title Page

At item (63), please delete "Continuation of application No. 17/708,805, filed on Mar. 30, 2022, now Pat. No. 11,634,147"

Signed and Sealed this
Seventeenth Day of June, 2025

Coke Morgan Stewart
*Acting Director of the United States Patent and Trademark Office*